July 24, 1962     G. E. BRACKETT     3,046,514
ELECTRIC TERMINAL
Filed Dec. 19, 1960

INVENTOR.
George E. Brackett
BY
Robert, Cushman & Grover
Atty's

United States Patent Office 3,046,514
Patented July 24, 1962

3,046,514
ELECTRIC TERMINAL
George E. Brackett, Candia, N.H., assignor to Basic Products Corporation, West Milwaukee, Wis., a corporation of Wisconsin
Filed Dec. 19, 1960, Ser. No. 76,794
7 Claims. (Cl. 339—100)

This invention relates to electric terminals and more particularly to terminals which may be attached to the ends of cables covered with insulation.

Various types of terminals have been devised for the ends of cables, particularly for those cables designed to carry a heavy current. These known types of terminals typically are attached in one of two ways. Either the insulation is stripped away from the conductor and the terminal then applied so as to grasp the wire directly or some sort of a sleeve is fitted over the insulation as well as the conductor so as to hold the terminal in place while electrical connection is made by means of a prong inserted longitudinally into the conductor. A disadvantage of each of these constructions is that the cable assembly is not insulated right up to the point of connection unless additional steps are taken.

Objects of the present invention are to provide a terminal for use with an insulated cable which may be applied without stripping back the insulation, which permits the cable insulation to protect both the conductor and the terminal up to the point of connection, which forms a very compact means for attachment of a cable to a circuit, which forms an excellent electrical connection, and which is of simple and inexpensive construction.

Accordingly the present invention contemplates a terminal including a tubular sleeve having an open end which may be forced between the conductor and the insulation of an electric cable. In a preferred embodiment there is provided an axial prong extending from the other end towards the open end along a portion of the length of the sleeve, the interior diameter of the sleeve at said open end approximating that of the conductor and being somewhat larger throughout said portion of the length.

For purposes of illustration a preferred embodiment is shown in the accompanying drawings in which.

Figure 1:
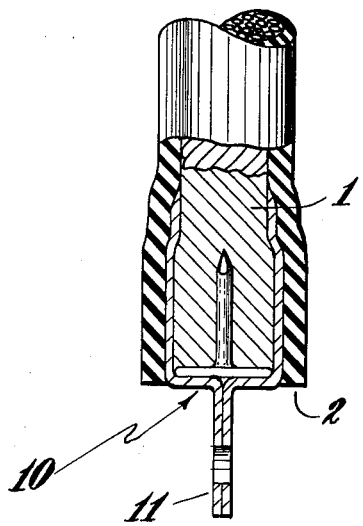
FIG. 1 is a partially broken away view of an assembled terminal and electric cable.
Figure 2:
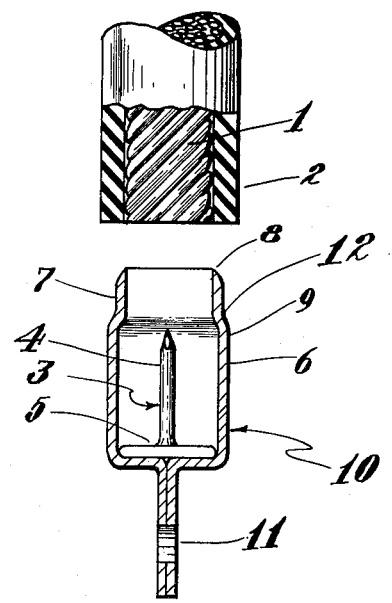
FIG. 2 is a broken away view of a terminal and a cable before assembly.

Referring now to the drawings a terminal 10 includes a tubular sleeve 9 having an open end terminating in a tapered circumferential edge 8. The opposite end of the sleeve 9 is flattened and apertured as at 14 so as to form a spade lug 11. A nail 3 including a prong 4 and head 5 fits frictionally inside the sleeve 9 with the head 5 adjacent the lug 11.

Preferably, the sleeve 9 is formed so that the portion 7 adjacent the open end is of substantially the same diameter as the conductor of the cable with which the terminal is to be associated, while the portion 6 of the sleeve adjacent the prong 4 is then of somewhat larger diameter. Such a terminal is useful with a cable, as shown in the drawings, having a stranded conductor 1 and an expansible insulating covering 2.

In use the terminal 10 is forced onto the cable so that the tapered edge 8 wedges between the conductor 1 and the insulation 2. When the cable reaches the prong 4 and the enlarged portion 6 of the sleeve 9, the prong longitudinally pierces the stranded conductor 1 as shown in FIG. 1, causing it to spread and come into intimate contact with the inside surface of the conducting sleeve 9. Any subsequent attempt to remove the cable from the terminal 10 will cause the nail 3 to slide with the conductor 1. The conductor 1 will thus remain expanded and will wedge at the throat 12 leading to the narrower portion 7 of the sleeve 9.

Figure 3:
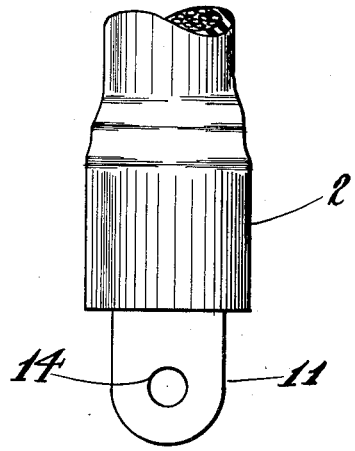
FIG. 3 is a plan view of an assembled terminal and cable.

It should be noted that the terminal 10 does not depend upon the nail 3 as the only electrical connection with the conductor 1. Rather, contact is made between the sides of the conductor 1 and the full internal length of the sleeve 9. Further, as shown in FIG. 3, the cable's insulation 2 covers the whole terminal assembly substantially up to the point of connection, thus eliminating any need for an additional insulating sleeve or for taping.

It should be understood that this disclosure is for the purpose of illustration only and that the present invention includes all modifications and equivalents falling within the scope of the appended claims.

I claim:

1. For application to the end of a conductor covered with insulation, a terminal lug comprising a tubular sleeve having an open end and an axial prong extending from the other end toward the open end along a portion of the length of the sleeve, said conductor being penetrable by said prong, the interior diameter of the sleeve approximating that of the conductor at said open end and being larger throughout said portion of the length of the sleeve whereby, when the sleeve is inserted between the insulation and conductor, the insulation is expanded, the smaller end of the sleeve fits around the conductor and the prong expands the conductor into the larger portion of the sleeve, thereby to lock the sleeve on the conductor, said prong being free to move longitudinally of the sleeve so as to remain in the conductor when the sleeve is retracted.

2. For application to the end of a conductor covered with insulation, a terminal lug comprising a tubular sleeve having an open end, an axial prong extending from the other end toward the open end along a portion of the length of the sleeve and a connector means, the interior diameter of the sleeve approximating that of the conductor at said open end and being larger throughout said portion of the length of the sleeve, said conductor being penetrable by said prong, the open end of the sleeve including a tapered circumferential edge whereby, when the sleeve is inserted between the conductor and insulation, the smaller end of the sleeve fits around the conductor and the prong expands the conductor into the larger portion of the sleeve, thereby to lock the sleeve on the conductor, said prong being free to move longitudinally of the sleeve so as to remain in the conductor when the sleeve is retracted.

3. In combination with a conductor covered with insulation, a terminal lug comprising a tubular sleeve having an open end, an axial prong extending from the other end toward the open end along a portion of the length of the sleeve, said conductor being penetrable by said prong, the interior diameter of the sleeve approximating that of the conductor at said open end and being larger throughout said portion of the length of the sleeve whereby, the sleeve being inserted between the conductor and the insulation, the smaller end of the sleeve fitting around the conductor and the prong expanding the conductor into the larger portion thereby to lock the sleeve on the conductor, said prong being free to move longitudinally of the sleeve so as to remain in the conductor when the sleeve is retracted.

4. For application to a stranded conductor covered to its end with insulation, a terminal comprising a tubular sleeve having an open end, the diameter of the sleeve adjacent the open end being substantially equal to that of the conductor and the diameter adjacent the opposite end being somewhat larger, a nail the head of which is loosely held by said sleeve at said other end, means blocking passage of said nail through said other end whereby, when the terminal sleeve is inserted between the conductor and the insulation, the nail will spread the strands of the conductor filling the larger diameter portion of the sleeve and will then be free to move with the conductor so that the conductor will wedge in the narrower portion of the sleeve if removal is attempted.

5. For application to the end of a stranded conductor covered with insulation, a terminal lug comprising a tubular sleeve having an open end, a nail including a prong loosely held in said sleeve and arranged so that the prong extends axially within the sleeve from the other end toward the open end along a portion of the length of the sleeve, the interior diameter of the sleeve approximating that of the conductor at said open end and being larger throughout said portion of the length of the sleeve whereby, when the sleeve is inserted between the conductor and the insulation, the smaller end of the sleeve fits around the conductor and the prong expands the conductor into the larger portion of the sleeve locking the sleeve on the conductor, the nail then being free to move with the conductor, said prong being free to move longitudinally of the sleeve so as to remain in the conductor when the sleeve is retracted.

6. For application to the end of a conductor covered with insulation, a terminal lug comprising a tubular sleeve having an open end and a flattened end, and an axial prong extending from the flattened end toward the open end along a portion of the length of the sleeve, said conductor being penetrable by said prong, the interior diameter of the sleeve approximating that of the conductor at said open end and being larger throughout said portion of the length of the sleeve whereby, when the sleeve is inserted between the insulation and the conductor, the insulation is expanded, the smaller end of the sleeve fits around the conductor and the prong expands the conductor into the larger portion of the sleeve, thereby to lock the sleeve on the conductor, said prong being free to move longitudinally of the sleeve so as to remain in the conductor when the sleeve is retracted.

7. For application to the end of a conductor covered with insulation, a terminal lug comprising a tubular sleeve having an open end and an axial prong extending from the other end toward the open end along a portion of the length of the sleeve, said conductor being penetrable by said prong, the interior diameter of the sleeve approximating that of the conductor at said open end and being larger throughout said portion of the length of the sleeve whereby, when the sleeve is inserted between the insulation and conductor, the insulation is expanded, the smaller end of the sleeve fits around the conductor and the prong expands the conductor into the larger portion of the sleeve, said prong being mounted in the sleeve so as to be held coaxially therewith while the sleeve is telescoped over the end of a conductor, said prong having a head seating on said other end of the sleeve and fitting frictionally in the sleeve, whereby the prong is held coaxially with the sleeve while the sleeve is telescoped over the end of a conductor, said prong being free to move longitudinally of the sleeve so as to remain in the conductor when the sleeve is retracted.

References Cited in the file of this patent
UNITED STATES PATENTS

| | | |
|---|---|---|
| 1,699,825 | Waltz | Jan. 22, 1929 |
| 2,020,819 | Bell | Nov. 12, 1935 |
| 2,887,667 | Wolfe et al. | May 19, 1959 |

FOREIGN PATENTS

| | | |
|---|---|---|
| 1,003,298 | France | Nov. 14, 1951 |
| 1,073,564 | Germany | Jan. 21, 1960 |